US007888902B2

(12) United States Patent  
Assar et al.

(10) Patent No.: US 7,888,902 B2
(45) Date of Patent: Feb. 15, 2011

(54) ADJUSTABLE VOICE COIL MOTOR DRIVER (75) Inventors: Farzin Assar, San Jose, CA (US); Scott E. Heeren, San Jose, CA (US); Lee D. Nguyentran, San Jose, CA (US); Bryan S. Rowan, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 508 days.

(21) Appl. No.: 12/005,955

(22) Filed: Dec. 28, 2007

(65) Prior Publication Data

US 2009/0168239 A1 Jul. 2, 2009

(51) Int. Cl.
*G05D 23/275* (2006.01)

(52) U.S. Cl. .................. 318/632; 318/619; 318/638; 318/678

(58) Field of Classification Search .................. 318/560, 318/561, 592, 619, 632, 638, 677, 678, 679, 318/680; 360/75, 78.01, 78.04, 78.05, 78.06, 360/78.12; 369/43, 30.1, 30.11, 30.12
See application file for complete search history.

(56) References Cited

U.S. PATENT DOCUMENTS

| 4,200,827 | A | 4/1980 | Oswald |
| 4,270,073 | A | 5/1981 | Harman |
| RE31,160 | E | 2/1983 | Kinjo |
| 4,697,127 | A | 9/1987 | Stich et al. |
| 5,062,023 | A | 10/1991 | Squire |
| 5,128,813 | A | 7/1992 | Lee |
| 5,204,932 | A | 4/1993 | Shinohara et al. |
| 5,227,709 | A | 7/1993 | Gauthier et al. |
| 5,297,024 | A | 3/1994 | Carobolante |
| 5,325,030 | A | 6/1994 | Yamamura et al. |
| 5,850,139 | A | 12/1998 | Edwards |
| 5,912,542 | A | 6/1999 | Zalesski |
| 6,417,639 | B1 * | 7/2002 | Schillaci et al. ............. 318/560 |
| 6,788,490 | B2 * | 9/2004 | Schillaci et al. .......... 360/78.04 |
| 6,791,785 | B1 | 9/2004 | Messenger et al. |
| 6,937,427 | B2 * | 8/2005 | Tan et al. .................. 360/78.04 |

(Continued)

OTHER PUBLICATIONS

Hao, et al., "TMR Online Optimization Using Quasi-Newton Method for HDD Servo Systems", *Proceedings of the American Control Conference*, (2000),3412-3416.

(Continued)

*Primary Examiner*—Walter Benson
*Assistant Examiner*—Thai Dinh (57) ABSTRACT

A method of configuring a signal for controlling a voice coil motor (VCM) is disclosed. A voltage at an error amplifier of a VCM driver is accessed. A target value at the error amplifier is accessed. A difference value between the target value and the voltage is determined. An impedance value of the variable compensation coupled with the error amplifier is adjusted, based on the difference value.

12 Claims, 5 Drawing Sheets

U.S. PATENT DOCUMENTS

| | | | |
|---|---|---|---|
| 6,995,537 | B1 | 2/2006 | Plutowski et al. |
| 7,092,197 | B2 | 8/2006 | El-Sherif et al. |
| 7,196,863 | B2 * | 3/2007 | Sakamoto .................... 360/75 |
| 7,522,368 | B2 * | 4/2009 | Xia et al. ...................... 360/67 |
| 7,652,445 | B2 * | 1/2010 | Xia et al. .................... 318/632 |
| 2008/0123216 | A1 * | 5/2008 | Kuramoto et al. ............. 360/75 |

OTHER PUBLICATIONS

Chow, et al., "Adaptive Equalization for Disk Drives", *Proceedings of the American Control Conference*, (Jun. 2001),3836-3842.

Ishikawa, et al., "Pivot Friction Compensation Using an Accelerometer and a Disturbance Observer for Hard Disk Drives", *IEEE/ASME Transactions on Mechatronics*, vol. 3, (Sep. 1998), 194-201.

* cited by examiner

```
┌─────────────────────────────────┐
│ Access a voltage at an error    │
│ amplifier of a voice coil motor │
│ (VCM) driver transconductance   │
│ amplifier.                      │
│ 405                             │
└─────────────────────────────────┘
              │
              ▼
┌─────────────────────────────────┐
│ Access a target value at the    │
│ error amplifier.                │
│ 410                             │
└─────────────────────────────────┘
              │
              ▼
┌─────────────────────────────────┐
│ Determine a difference value    │
│ between the target value and    │
│ the voltage.                    │
│ 415                             │
└─────────────────────────────────┘
              │
              ▼
┌─────────────────────────────────┐
│ Adjust an impendence value of a │
│ variable compensation based on  │
│ the difference value, wherein   │
│ the variable compensation is    │
│ coupled with the error          │
│ amplifier.                      │
│ 420                             │
└─────────────────────────────────┘
```

ADJUSTABLE VOICE COIL MOTOR DRIVER

TECHNICAL FIELD

The present invention relates to the field of hard disk drive development, and more particularly to configuring a signal for controlling a voice coil motor.

BACKGROUND ART

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the HDD, has undergone many changes.

In operation, the hard disk is rotated at a set speed via a spindle motor assembly having a central drive hub. Additionally, there are tracks spaced at known intervals across the disk. Tracks are further subdivided into discrete portions called sectors. In a DASD device featuring an embedded, or sector, servo system, radial position information is encoded in read-only servo sectors interspersed with data sectors. When a request for a read of a specific data sector or sectors or track is received, the hard disk aligns the head, via the arm, over the specific track location and the head reads the appropriate information from the disk as it passes beneath the head. In the same manner, when a request for a write to a specific data sector or sectors or track is received, the hard disk aligns the head, via the arm, over the specific track location and the head writes the information to the disk as the appropriate sector(s) pass(es) beneath the head.

The amount of data that can be stored on a disk is governed by many well-known physical principles. One factor in determining the amount of data that can be stored in an HDD is the ability of the magnetic transducer to write closely spaced data tracks onto the disk surface. The spacing of tracks on a disk surface is known as track pitch, and the unit of measure for expressing the density of tracks on a disk is tracks per inch or TPI. A smaller track pitch results in a higher TPI. The servo system of the HDD enables in part the magnetic transducer to be positioned precisely to read or write a data track at a radius on the disk, thus enabling adjacent data tracks to be written with a high TPI.

Whether the data track is being written or read, the HDD must be able to find the track and settle upon it in a minimal amount of time. This amount of time is typically known as seek-settle time. When seek-settle time is coupled with the time for the target data sector to rotate to where it can be read or written and the time required for the HDD to transfer the data between the host computer and the disk, this total time is known as latency. An HDD user usually prefers short latency. The robustness of the servo system will determine if the magnetic transducer has settled on a desired data track or needs to make another attempt at settling on the data track.

The robustness of the servo system is affected by the ability of the voice coil motor driver to direct the voice coil motor to align the head, via the arm, over the desired specific track location. Ultimately, the quicker and more accurate the servo system is in locating a specific track location, the faster an HDD may perform, thereby reducing latency. Continuing advances are being made in the design of HDDs as more demands are made for faster HDD performance.

SUMMARY

A method of configuring a signal for controlling a voice coil motor (VCM) is disclosed. A voltage is accessed at an error amplifier of a VCM driver. A target value is accessed at the error amplifier. A difference value between the target value and the voltage is determined. An impedance value of the variable resistor is adjusted based on the difference value, wherein the variable compensation is coupled with the error amplifier.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to obscure aspects of the present invention unnecessarily.

For the sake of brevity and clarity, the discussion will focus on a servo control system, and then on a brief description of the invention itself. Then, the discussion will focus upon an HDD as an example of a mechanism operable to a control and/or servo system that benefits from the embodiments of the present invention. The discussion will then describe embodiments of the present invention by which configuring a signal for controlling a voice coil motor coupled with a control or servo system is implemented.

Overview

A servo system is a control system that controls the operation of an apparatus through a series of feedback signals to the control system. The feedback signal is typically from a sensor that determines the offset of the actual operation of the apparatus from the requested operation of the apparatus. A servo system in a hard disk drive (HDD) controls the voice coil motor (VCM), which in turn affects slider movement.

By controlling the VCM current (or, alternatively, acceleration) by means of a VCM driver, a typical HDD servo system directs a VCM to place a slider at a requested track position. The difference between the requested track position and the actual track position is the position error. Position feedback results in a series of consecutive attempts, or requests, to be made in order to arrive at the requested track position.

The request may become distorted as it moves through the VCM driver and VCM due to the combined electrical frequency response. This distortion contributes to slider position error; however, this distortion may be compensated for by factoring the known or estimated nominal inductance and resistance values for the VCM into a compensation network, Zc. This method of compensation is performed repeatedly until a satisfactory track position is achieved. However, this method of compensation is only accurate for a static VCM. In other words, the anticipated nominal values and the expected position error for which compensation is made are based upon a static VCM. This method of compensation is not as accurate for a VCM which is in operation because it does not take into account the varying resistance values of a VCM due to operational factors.

For example, these operational factors may relate to the heating and/or cooling of a VCM within an HDD. When the VCM is in operation, it heats up, changing the resistance of the VCM's material. When the VCM is no longer in use, it cools down, also changing the resistance of the VCM's material. The heating and cooling of a VCM in operation causes the resistance value within the VCM to vary.

The varying resistance values during the VCM operation create larger unexpected position errors. More attempts at finding the requested track position are made in an effort to compensate for these larger position errors. In other words, the heating and cooling of the VCM while in operation changes the VCM resistor's expected nominal value to an unexpected value, resulting in unexpected errors that make compensation difficult. These unexpected errors increase seek-settle time, and hence slow an HDD's performance.

Embodiments of the present invention provide a more accurate compensation signal, thereby reducing the position error and providing a better actuator head performance which isn't susceptible to the heating and cooling of the VCM. By utilizing the adjustable VCM driver described herein, adjustments can be made to minimize the position error of the slider, given the operational environment and/or various modes of operation. The adjustable VCM driver contains a variable resistor which adjusts to compensate for the varying resistance values of an operating VCM. Hence, even if the resistance in the VCM varies due to its heating and cooling, the adjustable VCM driver compensates for these varying resistances, resulting in quicker, more accurate positioning of the slider.

Hard Disk Drive

Figure 1:
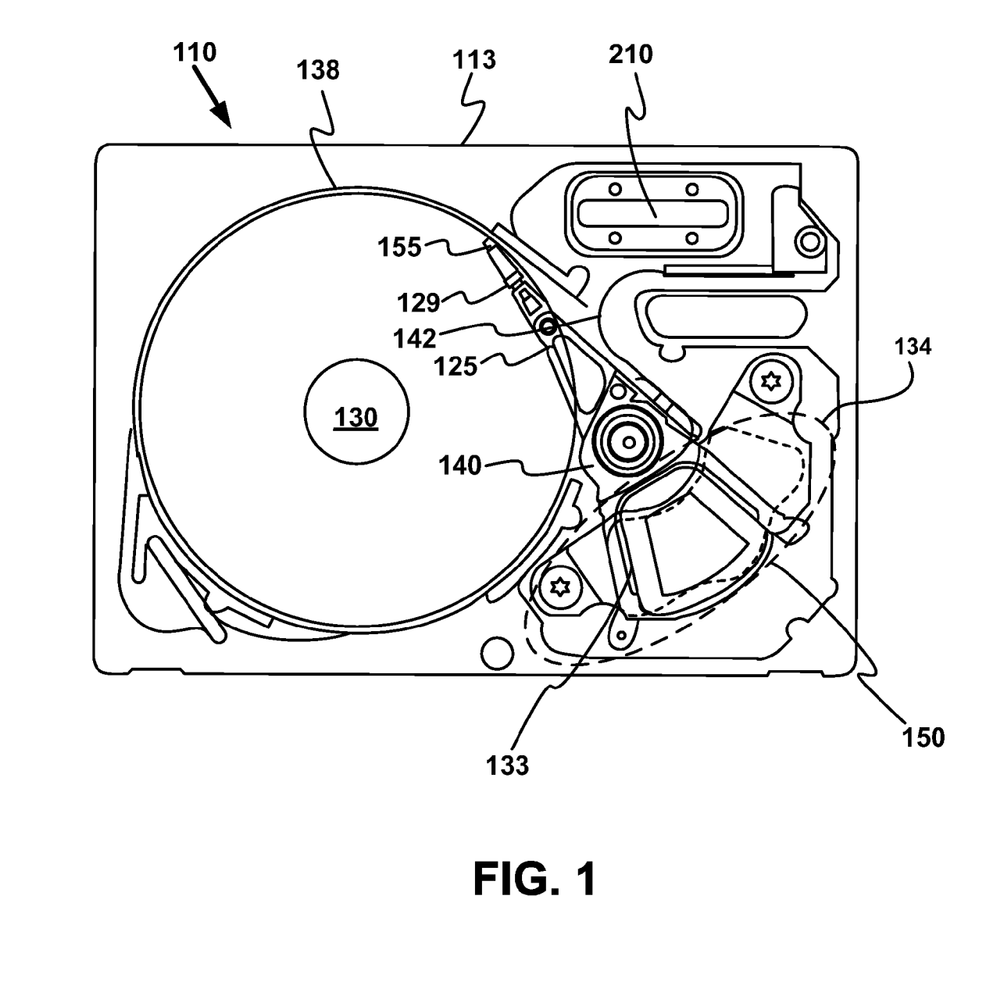
FIG. 1 is a plan view of an HDD with cover and top magnet removed in accordance with one embodiment of the present invention.

With reference now to FIG. 1, a schematic drawing of one embodiment of an information storage system including a magnetic hard disk file or HDD 110 for a computer system is shown. Although only one head and one disk surface combination are shown, what is described herein for one head-disk combination is also applicable to multiple head-disk combinations. In other words, the present invention is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 125. When a number of actuator arms 125 are present, they are usually represented in the form of a comb that is movably or pivotally mounted to base/housing 113. A VCM assembly 150 is also mounted to base 113 for moving the actuator arms 125 relative to the disk 138. It is appreciated that VCM assembly 150 includes a VCM. Actuator assembly 140 may be coupled with a connector assembly 210 by a flexible cable assembly 142, which is utilized to convey data between arm electronics and an external circuit board (not shown) for transfer to and from a host system, such as a computer, wherein HDD 110 resides.

In one embodiment, each arm 125 has extending from it at least one cantilevered suspension 129. The slider 155 is usually bonded to the end of the suspension 129. The level of integration containing the slider 155, suspension 129, and read/write head is called the head gimbal assembly (HGA).

The suspension 129 has a spring-like quality, which biases or presses the air-bearing surface of slider 155 against disk 138 to cause slider 155 to fly at a precise distance from disk 138. The suspension 129 has a hinge area that provides for the spring-like quality, and a flexing interconnect that supports read and write traces and electrical connections through the hinge area. A voice coil 133, free to move within a conventional voice coil motor magnet assembly 134 is also mounted to actuator arms 125 opposite the head gimbal assemblies. Movement of the actuator assembly 140 by voice coil motor assembly 150 causes the head gimbal assembly to move along radial arcs across tracks on the surface of disk 138.

The example of an HDD as a mechanism operable to a control and/or servo system that benefits from the embodiments of the present invention most commonly operates with a control system that comprises a servo system with a servo loop. As known by one of ordinary skill in the art, the servo loop of the servo system of an HDD feeds back positional information of slider 155 to a position controller, whereby adjustments can be made to the actual position of slider 155 to meet more closely the requested position of slider 155.

The difference between the anticipated position of slider 155 and the requested position of slider 155 is considered to be the position error signal (PES) for which compensation must be made. The calculation for slider 155's anticipated position takes into account the frequency response of the VCM driver, which itself is influenced by the VCM's inductance and resistance values. However, when the VCM heats up and cools down while in operation, its resistance value changes. These resulting varying resistance values have the effect of distorting position error signal calculations relating to slider 155. As a result of these distortions of position error signals, the calculated compensation necessary to address the position error signals is inaccurate. Additionally, certain modes of VCM operation require intentional variance from the anticipated position error signal, in order to compensate for errors occurring during read/write processes.

However, by utilizing the adjustable voice coil motor driver described herein, adjustments can be made to minimize the PES of slider 155, given the operational environment and/or various modes of operation. Hence, even if the resistance in the VCM varies due to the heating and cooling of the VCM, the adjustable voice coil motor driver compensates for these varying resistances, resulting in a more accurate positioning of slider 155.

Architecture

Figure 2:
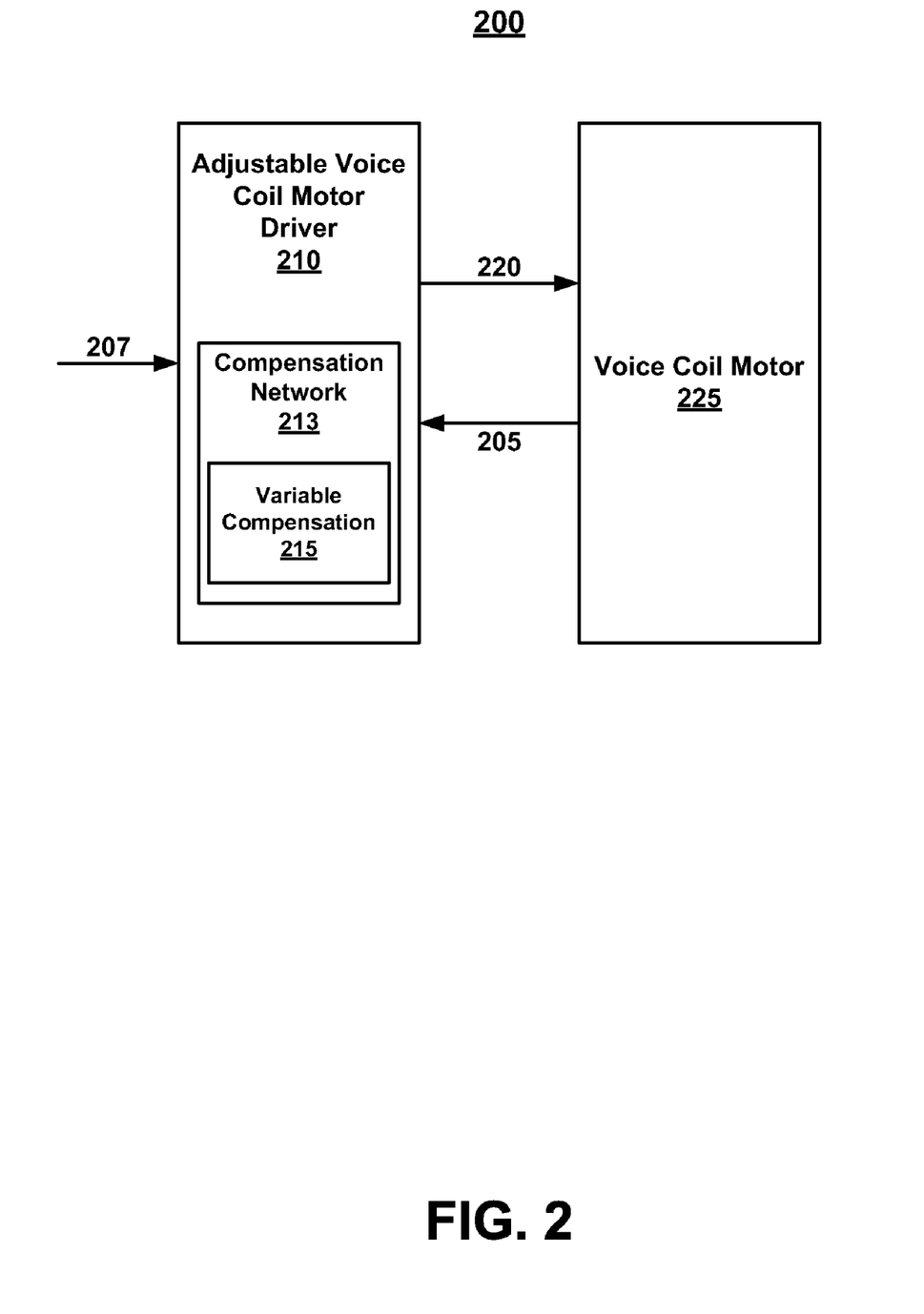
FIG. 2 is a schematic of a transconductance amplifier loop operable to embodiments of the present invention.

FIG. 2 shows a block diagram of an overview of an embodiment of the present invention. In one embodiment, transconductance amplifier loop 200 of FIG. 2 is an adjustable VCM driver 210 receiving input 207 from a digital-to-analog converter and coupled with VCM 225 of VCM assembly 150. Transconductance amplifier loop 200 of FIG. 2 is presented as operable to embodiments of the present invention. Transconductance amplifier loop 200 provides a more accurate compensation signal, thereby reducing the position error and providing a better actuator head performance which isn't susceptible to the heating and cooling of the VCM.

A typical VCM driver is known and understood in the art for providing a current that is proportional to a voltage that it receives. A VCM driver is commonly used in control systems for controlling a positioning apparatus, such as VCM 225. An example of a positioning apparatus is presented in FIG. 1 as VCM 225 within VCM assembly 150 for positioning slider 155 adjacent to data tracks. Adjustable VCM driver 210 also performs the functions of a typical VCM driver as well as the innovative functions described herein.

With continued reference to FIG. 2, a digital-to-analog converter output, (DAC out) converts a digital voltage of a control command to an analog voltage of a control command, and presents it via input 207 to adjustable VCM driver 210 for processing. With reference now to FIG. 2 and to FIG. 5, a block diagram of a linear VCM driver is shown in accordance with embodiments of the present technology. Inherent in adjustable VCM driver 210 is one or more voltage references Vref 505a, 505b and 505c which provide at least one reference voltage to an error amplifier 510a, power amplifier 510b, and/or current sensing amplifier 510c. Vref 510b is typically half of the voltage delivered by the power supply. Vref 510b is electrically coupled with the power supply voltage, the performance of the error amplifier 510a, the power amplifier 510b, and the current sensing amplifier 510c.

Figure 5:
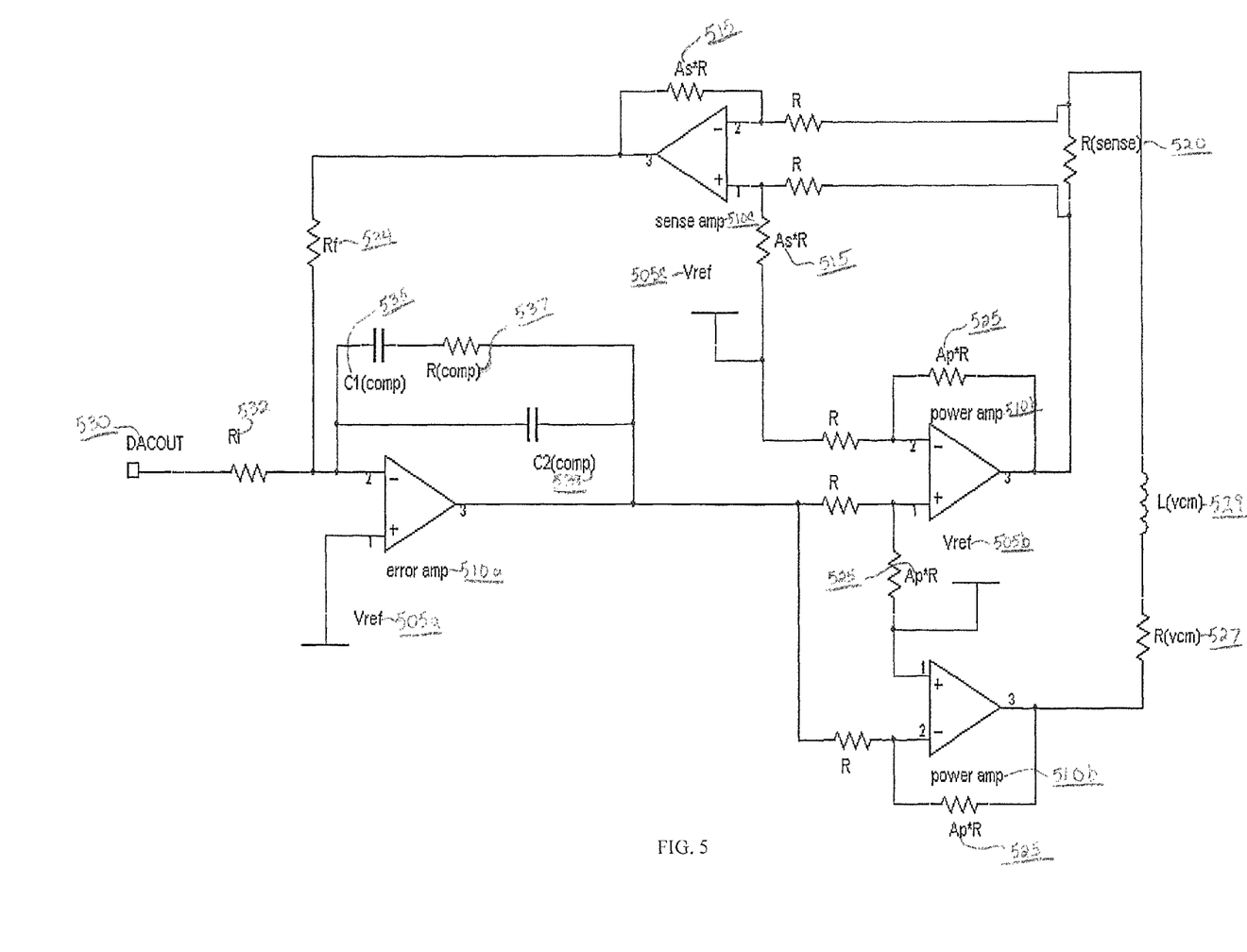
FIG. 5 is a block diagram of a linear VCM driver in accordance with embodiments of the present invention.

Associated with each amplifier is an array of electrical components. For example, associated with the sensing amplifier are sense feedback resistors, and sense input resistors. The sense amplifier has a gain of As 515, and is connected with the sense resistor, R(s) 520. There are similarly associated components for the error amplifier 510a and the power amplifier 510b. The power amplifier 510b has a gain of Ap 520. This power amplifier 510b is a differential driver, with the difference being the product of two and Ap 525. Each of these components has its own inherent performance or tolerance for its expected electrical parameter. In turn, the tolerance of each electrical component affects the performance of the associated amplifiers, and the performance of adjustable VCM driver 210. The performance of adjustable VCM driver 210 has specified tolerances.

In operation, VCM 225 is represented by the series resistor and inductor combination (R(vcm) 527 and L(vcm) 529, respectively) of passive circuit elements. Transconductance amplifier loop 200 receives an input 207 voltage at digital-to-analog converter output (DACOUT) 530 via a resistor (Ri) 532 and translates received input 207 voltage into a corresponding output current through [R(vcm) 527+L(vcm) 529] at VCM 225.

The translated output current is received 205 and then measured at a sense amplifier 510c by converting the output current to a voltage at its input via a sense resistor (Rs) 515.

The sensed and converted voltage is fed back to the input of the error amplifier 510a via a feedback resistor (Rf) 534. The function of the error amplifier 510a is to compare the requested value (input 207 voltage) with that fed back by the current sensing amplifier 510c.

The error amplifier 510a then conditions the relative difference between the requested value and that value fed back by the current sensing amplifier 510c. The error amplifier 510a conditions this relative difference utilizing a compensation network, Zc. In one embodiment, Zc consists of the combination of the series elements capacitor C1(comp) 535 and resistor R(comp) 537 in parallel with capacitor C2(comp) 539. Capacitor C2(comp) 539 may be optional. The equivalent impedance of this adjustable compensation network is Zc(s), where 's' is a function of complex frequency.

R(comp) 537 is expressed as R(ext)+R(int), wherein R(ext) is fixed resistor, and R(int) is variable compensation network 215. Variable compensation network 215 is present in the feedback path of the error amplifier 510a, and is embedded in the error amplifier 510a integrated circuit such that its resistance can be adjusted dynamically according to a value programmed into a control register. This control register value indicates switches which are to be opened and/or closed in order to establish the proper impedance to insert into the error amplifier's feedback path. In the present embodiment, R(int) represents a variable resistor. It is to be understood that R(int) represents only one embodiment of variable compensation 215 and that any combination of variable impedance elements may be possible. For example, variable compensation 215 may consist of (but is not limited to) capacitance, resistance and inductance terms, or their functional equivalents.

Zc(s) is expressed as follows:

$$[1+s*C1(\text{comp})*R(\text{comp})]/[s*(C1(\text{comp})+C2(\text{comp}))+s*s*C1(\text{comp})*C2(\text{comp})*R(\text{comp})].$$

The AC gain of VCM driver 210 may be expressed as follows:

$$(2*Ap*Zc(s)*Rf)/[Rf*Ri*(R(vcm)+R(\text{sense})+L(vcm)*s)+2*Ap*As*Rs*Ri*Zc(s)].$$

The AC gain of adjustable VCM driver 210 represents the transconductance as a function of complex frequency. It indicates the corresponding acceleration value at which slider 155 is displaced away from its intended position. This corresponding value indicates the amount of adjustment necessary in order to compensate for the position displacement of slider 155, and ultimately enables efficient and more accurate seek settling.

The assumption generally applied to adjustable VCM driver 210 for which position signal errors are shown to be compensated is that the series combination of components R(comp) 537 and C1(comp) 535 are specified such that R(comp) 537*C1(comp) 535=L(vcm) 529/R(vcm) 527. In this case, R(vcm) 527 varies according to the heating and cooling of VCM 225 while in operation. Variable resistor 215 within R(comp) 537 is utilized to apply a value which would result in R(comp) 537*C1(comp) 535=L(vcm) 529/R(vcm) 527, given a varying R(vcm) 527. Thus, a variable response is enabled, which allows for modification of a compensation network without component-level hardware changes. After adjusting variable resistor 215 and hence the AC gain of adjustable VCM driver 210, this adjustment is applied 220 to VCM 225. The resulting position error signal is then fed back by the servo system via input 207 voltage to adjustable VCM driver 210, at which point, another adjustment may be made so that R(comp) 537*C1(comp) 535 may eventually equal or come as near as possible to L(vcm) 529/R(vcm) 527.

Figure 3:
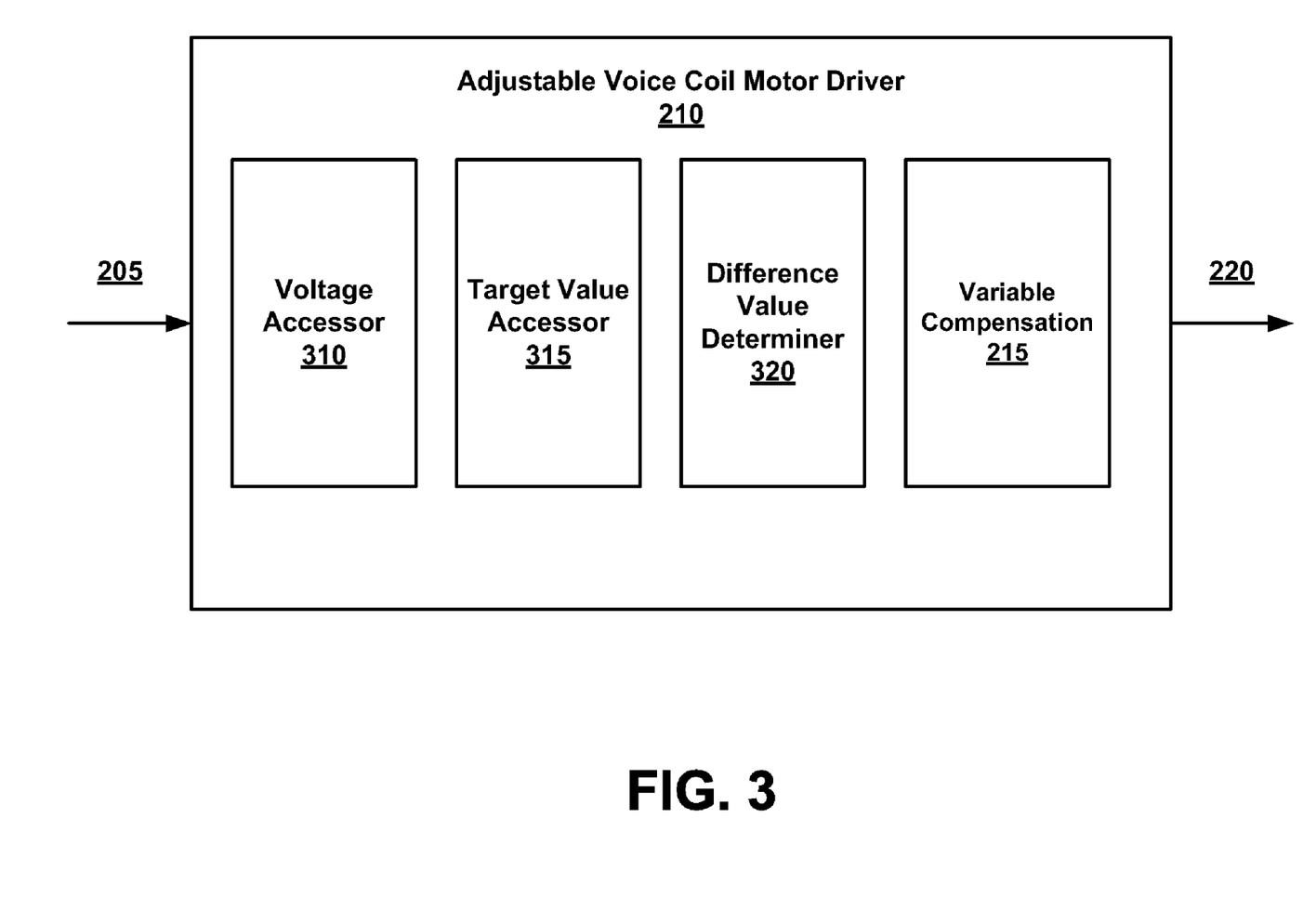
FIG. 3 is a block diagram of an example adjustable voice coil motor driver in accordance with one embodiment of the present invention.

Referring now to FIG. 3, a block diagram of an example adjustable VCM driver 210 for configuring a signal for controlling VCM 225, in accordance with one embodiment of the present invention is shown. Adjustable VCM driver 210 includes voltage accessor 310, target value accessor 315, difference value determiner 320, and variable compensation 215.

Voltage accessor 310 is configured to access a voltage 205 at an error amplifier of adjustable VCM driver 210. As described herein, in one embodiment, this voltage is received from a sense amplifier via a feedback resistor.

Target value accessor 315 is configured to access a target value at the error amplifier. This target value may be received from a digital-to-analog converter along with the input voltage received from DACOUT via an input resistor. This target value may also be received from a source other than DACOUT. The target value is the value corresponding to the desired trajectory of VCM 225, and hence slider 155.

Difference value determiner 320 is configured to determine a difference value between the target value and the accessed voltage. In other words, in one embodiment, this difference value is the result of a comparison between a reference value (the target value) and that value which was fed back by the current sensing amplifier via a feedback resistor, to get an error signal representing this difference.

Variable compensation 215 is configured to adjust an impedance value of variable compensation 215 based on the difference value. Variable compensation 215 is coupled with the error amplifier. The equations associated with R(comp)*C1(comp)=L(vcm)/R(vcm) and described herein, are utilized while adjusting the compensation value.

In one embodiment, a fixed resistor, R(ext) and a capacitor, C(comp), is in series with variable compensation 215. In this embodiment, variable compensation 215 is a variable resistor. The fixed resistor may be described as an external fixed resistor, and variable compensation 215 may be described as an internal variable resistor. Additionally, at least a second capacitor may be present, and in parallel with the first capacitor (that capacitor which is in series with the fixed resistor and variable compensation 215).

In another embodiment of the present invention, variable compensation 215 comprises a VCM driver operation mode adjuster, and a VCM operating environment mode adjuster. VCM driver operation mode adjuster is configured to adjust the impedance value of variable compensation 215 according to a mode of a VCM driver operation. Modes of VCM drive operation include but are not limited to seeking and tracking. Different AC responses of adjustable VCM driver 210 may be desirable depending upon whether VCM 225 is seeking or tracking.

For example, in one embodiment, VCM driver operation mode adjuster comprises a bandwidth modifier configured for modifying a bandwidth according to a VCM driver operation mode. In other words, VCM driver operation mode adjuster comprises a bandwidth modifier which modifies a bandwidth according to whether adjustable VCM driver 210 is in seek or track mode.

In one embodiment, the bandwidth modifier comprises a value decreaser and a value increaser. The value decreaser is configured for decreasing a value of variable compensation 215 to obtain a lower magnitude response with an increased phase loss. This response is useful for the seek mode, while fine tuning a large signal power amplifier response. The value increaser is configured for increasing a value of variable compensation 215 to obtain a higher magnitude response with a reduced phase loss. This response is useful for the track mode, while fine tuning a small signal power amplifier response.

A VCM operating environment mode adjuster is configured to adjust the resistance value of variable compensation 215 according to a mode of a VCM 225 operating environment. The operating environment of VCM 225 is reflected in its state. For example, when VCM 225 is in use, it either heats up or cools down. This change in temperature affects the resistance of the VCM material, and ultimately is the cause of sources of error resulting in track misregistration. However, the present invention tracks these temperature changes in various ways, enabling adjustable VCM driver 210 to account for and compensate for these sources of error caused by unexpected temperature changes.

For example, one embodiment of the present invention comprises a temperature sensor reader configured to read a temperature sensor and make corresponding adjustments to variable compensation 215. It is appreciated that these adjustments may be made automatically or manually.

Operation

Figure 4:
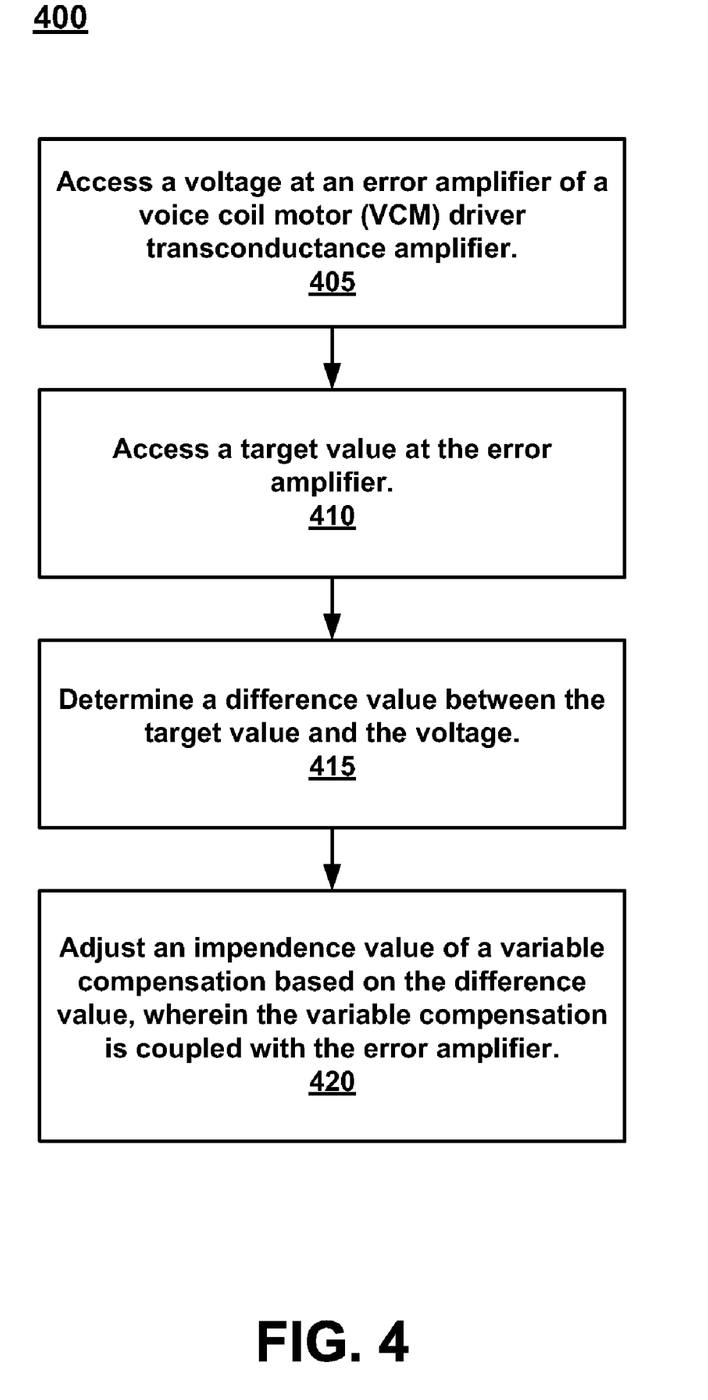
FIG. 4 is a flow chart illustrating a process of configuring a signal for controlling a voice coil motor in accordance with one embodiment of the present invention.

Referring to FIG. 4, a flowchart of an example method of configuring a signal for controlling VCM 225 in accordance with one embodiment of the present invention is shown. It is appreciated that embodiments of the present invention may be implemented as a computer process, or may reside in software. In operation and referring to 405 of FIG. 4 and to FIG. 2, the present invention accesses a voltage at an error amplifier of adjustable VCM driver 210. In relation to the operation of the VCM transconductance loop 200 described herein, this voltage is fed back from the sense amplifier via a feedback resistor.

In reference to 410 of FIG. 4 and to FIGS. 2 and 3, a target value 207 is accessed at the error amplifier. As described herein, the target value may be accessed from a digital-to-analog converter via an input resistor, or in some other manner which enables a transconductance amplifier to access and/or receive a target value.

In reference now to 415 of FIG. 4, and to FIGS. 2 and 3, a difference value between the delivered target value and the accessed voltage is determined. This determination may be made once or repeatedly until a predetermined difference is achieved. For example, if the condition of R(comp)*C1(comp)=L(vcm)/R(vcm) is desired, then it may be necessary that more than one adjustment to variable compensation 215 be made before this condition is achieved.

In reference now to 420 of FIG. 4, and to FIGS. 1 and 2, an impedance value of variable compensation 215 is adjusted based on the difference value, wherein variable compensation 215 is coupled with the error amplifier. This impedance value may be adjusted on the fly, automatically, or it may be customized on an individual per unit basis.

In one embodiment, adjusting an impedance value based on the difference value further comprises adjusting the impedance value of variable compensation 215 according to a mode of a VCM operating environment. As described herein, this mode of operating environment relates to the temperature changes experienced by VCM 225 during operation. Compensation network 213 may compensate for this temperature change in the various ways such as, but not limited to the following examples. For example, the VCM power may be monitored, and an estimate of the rising and falling of the temperature using a thermal time constant of the VCM may be used to approximate temperature effects. In this manner, the temperature changes may be accounted for. In another example, direct resistance measurements or rise time measurements may be made using current and/or voltage sensing of the VCM 225 during operation.

In another example, a temperature compensation algorithm may be implemented in drive firmware. This temperature compensation algorithm allows the compensation to be adapted to operating conditions. An internal temperature sensor (temperature sensor reader described herein), or a running estimate of a VCM power consumption and VCM temperature coefficients may be used to assist with the adaptation.

In one example of the criteria that may be used for making transitions, as part of the adjustment response to various operating modes and operation environment modes, the servo controller receives commands to move the read/write head to a target cylinder. The firmware may adjust the power amplifier response on the fly as part of the seek initialization as required for seeking. As the servo controller brings the read/write head close to arrival at the target customer data track location, the firmware can adjust the power amplifier response on the fly as part of the settle initialization as required for tracking.

Additionally, a customization process may be implemented in production which optimizes the adjustment response according to any possible number of various metrics, such as arrival profiles or performance tuning. These tuned, customized results may be stored in the drive electronics at the time of manufacturing for use in the field.

Thus, embodiments of the present invention provide an apparatus and method of configuring a signal for controlling a VCM. The apparatus and method described herein are enabled to account for and make compensating corrections for the difference between the actual positioning of slider 155 as opposed to the expected and intended positioning of slider 155, thereby enabling more efficient and accurate seek settling operations.

What is claimed is:

1. A method of configuring a signal for controlling a voice coil motor (VCM), said method comprising:
    accessing a voltage at an error amplifier of a VCM driver;
    accessing a target value at said error amplifier;
    determining a difference value between said target value and said voltage; and
    adjusting an impedance value of a variable compensation based on said difference value and according to at least one of a VCM driver operation mode and a VCM operating environment mode, said VCM driver operation mode comprising seeking or tracking, said VCM operating environment mode comprising temperature of said VCM, wherein said variable compensation is coupled with said error amplifier, and wherein said adjusting comprises:
        providing a combination of a variable capacitor in series with a resistor, said resistor comprising a fixed resistor and a variable resistor positioned in a feedback path of an error amplifier, said combination being a variable compensation network configured to be dynamically adjusted via opening and closing switches to establish an impedance to insert into said feedback path, said impedance determined according to a value programmed into a control register;
        in relation to said VCM driver operation mode, modifying a bandwidth according to said mode of a VCM driver operation, wherein said modifying is based on whether said VCM driver is seeking or tracking; and
        in relation to said VCM operating environment mode, implementing a temperature compensation algorithm configured for enabling said variable compensation network to adapt to a change in temperature within said VCM.

2. The method of claim 1, wherein said determining a difference value between said target value and said voltage further comprises:
    accessing said target value at a digital-to-analog converter.

3. The method of claim 1, wherein said adjusting an impedance value of a variable compensation network coupled with said error amplifier based on said difference value further comprises:
    providing a variable capacitor in parallel with a fixed capacitor which in turn is in series with a fixed resistor.

4. The method of claim 1, wherein said adjusting an impedance value of a variable compensation network coupled with said error amplifier based on said difference value further comprises:
    providing a network of variable capacitance in series with a network of variable resistance.

5. The method of claim 1, further comprising:
    increasing a value of said variable impedance to obtain a higher magnitude response with a reduced phase loss.

6. The method of claim 1, further comprising:
    decreasing a value of said variable impedance to obtain a lower magnitude response with an increased phase loss.

7. An adjustable voice coil motor (VCM) driver for configuring a signal for controlling a VCM, said adjustable VCM driver comprising:
    a voltage accessor configured to access a voltage at an error amplifier of a VCM driver;
    a target value accessor configured to access a target value at said error amplifier;
    a difference value determiner configured to determine a difference value between said target value and said voltage; and
    a compensation value adjuster configured to adjust an impedance value of a variable compensation network based on said difference value, wherein said variable compensation network is coupled with said error amplifier, said compensation value adjuster comprising:
        a combination of a variable capacitor in series with a resistor, said resistor comprising a fixed resistor and a variable resistor positioned in a feedback path of said error amplifier, said combination being said variable compensation network, said variable compensation network being configured to be dynamically adjusted via opening and closing switches to establish an impedance to insert into said feedback path, said impedance determined according to a value programmed into a control register;
        a VCM driver operation mode adjuster configured to adjust said impedance value of said variable compensation network according to a mode of a VCM driver operation, said mode of said VCM driver operation comprising seeking or tracking, said VCM driver operation mode adjuster comprising:
            a bandwidth modifier configured for modifying a bandwidth according to said mode of a VCM driver operation, wherein said modifying is based on whether said VCM driver is seeking or tracking; and
        a VCM operating environment mode adjuster configured to adjust said impedance value of said variable compensation network according to a mode of a VCM operating environment, said VCM operating environment mode adjuster comprising:

a temperature sensor reader configured for reading a temperature sensor and making corresponding adjustments to said variable compensation, said making corresponding adjustments comprising implementing a temperature compensation algorithm, said temperature compensation algorithm configured for enabling said variable compensation network to adapt to a change in temperature within said VCM.

8. The system of claim 7, further comprising:
a combination of a fixed resistor and a capacitor, in parallel with another capacitor.

9. The system of claim 7, further comprising:
a network of variable capacitance in series with a network of variable resistance.

10. The system claim 7, wherein said bandwidth modifier further comprises:
a value increaser configured for increasing a value of said variable impedance to obtain a higher magnitude response with a reduced phase loss.

11. The system of claim 7, wherein said bandwidth modifier further comprises:
a value decreaser configured for decreasing a value of said variable resistor to obtain a lower magnitude response with an increased phase loss.

12. A hard disk drive comprising:
a housing;
at least one disk mounted to the housing and rotatable relative to the housing;
an actuator mounted to said housing and being movable relative to said at least one disk, said actuator having a suspension for reaching over said at least one disk, said suspension having a slider coupled therewith, said slider having a read/write head element; and
a compensation value adjuster configured for adjusting an impedance value of said variable compensation network based on a difference value between a voltage accessed at an error amplifier of a voice coil motor (VCM) driver and a target value accessed at said error amplifier, wherein said compensation value adjuster is coupled with said error amplifier, said compensation value adjuster comprising:
a combination of a variable capacitor in series with a resistor, said resistor comprising a fixed resistor and a variable resistor positioned in a feedback path of said error amplifier, said combination being a variable compensation network configured to be dynamically adjusted via opening and closing switches to establish an impedance to insert into said feedback path, said impedance determined according to a value programmed into a control register;
a VCM driver operation mode adjuster configured to adjust said impedance value of said variable compensation network according to a mode of a VCM driver operation, said mode of said VCM driver operation comprising seeking or tracking, said VCM driver operation mode adjuster comprising:
a bandwidth modifier configured for modifying a bandwidth according to said mode of a VCM driver operation, wherein said modifying is based on whether said VCM driver is seeking or tracking; and
a VCM operating environment mode adjuster configured to adjust said impedance value of said variable compensation network according to a mode of a VCM operating environment, said VCM operating environment mode adjuster comprising:
a temperature sensor reader configured for reading a temperature sensor and making corresponding adjustments to said variable compensation network, said making corresponding adjustments comprising implementing a temperature compensation algorithm, said temperature compensation algorithm configured for enabling said variable compensation network to adapt to a change in temperature within said VCM.

* * * * *